US007636578B1

(12) United States Patent
Cope et al.

(10) Patent No.: US 7,636,578 B1
(45) Date of Patent: Dec. 22, 2009

(54) METHOD AND SYSTEM TO PROVIDE TEXT MESSAGES VIA A HOST DEVICE CONNECTED TO A MEDIA-DELIVERY NETWORK

(75) Inventors: Warren B. Cope, Olathe, KS (US); Von K. Mcconnell, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 809 days.

(21) Appl. No.: 11/117,205

(22) Filed: Apr. 28, 2005

Related U.S. Application Data

(63) Continuation-in-part of application No. 11/026,979, filed on Dec. 30, 2004.

(51) Int. Cl.
*H04Q 7/20* (2006.01)

(52) U.S. Cl. .................... 455/466; 455/414.4; 455/566; 455/415

(58) Field of Classification Search ............... 455/2.01, 455/3.01, 414.1, 466, 550.1, 412.1–2, 412.2, 455/415, 517, 566, 464, 414.2, 414.4, 417, 455/426.1; 370/260, 252, 259, 335, 342, 370/352; 709/206, 203
See application file for complete search history.

(56) References Cited

U.S. PATENT DOCUMENTS

| 5,557,320 | A | 9/1996 | Krebs |
| 6,678,673 | B1 * | 1/2004 | Eves et al. ..................... 707/3 |
| 2002/0122391 | A1 * | 9/2002 | Shalit ......................... 370/260 |
| 2003/0033605 | A1 | 2/2003 | Bartfeld |
| 2003/0226143 | A1 | 12/2003 | Michael et al. |
| 2004/0260772 | A1 * | 12/2004 | Mullen et al. ............... 709/206 |
| 2005/0060230 | A1 * | 3/2005 | Kaye ........................... 705/14 |
| 2005/0066365 | A1 | 3/2005 | Rambo |
| 2005/0182617 | A1 * | 8/2005 | Reynar et al. .................. 704/4 |
| 2006/0167976 | A1 * | 7/2006 | Brown et al. ................ 709/203 |

\* cited by examiner

*Primary Examiner*—John Lee

(57) ABSTRACT

The present invention relates to a system and method for integrating telecommunications and cable networks for the purpose of providing text messages to a cable host device over a cable network. The method includes delivering a text message to a cable host device. The text message may comprise a caller identification message, a short message service (SMS) message or an alert message containing a news headline, stock quote or sports score. Also described is a system for connecting telephone and cable networks to enable text messages to be received by a cable host device.

15 Claims, 8 Drawing Sheets

METHOD AND SYSTEM TO PROVIDE TEXT MESSAGES VIA A HOST DEVICE CONNECTED TO A MEDIA-DELIVERY NETWORK

CROSS-REFERENCE TO RELATED APPLICATIONS

This application is a continuation-in-part of U.S. patent application Ser. No. 11/026,979 filed Dec. 30, 2004.

STATEMENT REGARDING FEDERALLY SPONSORED RESEARCH OR DEVELOPMENT

None.

TECHNICAL FIELD

The present invention relates to integrating telecommunications and cable networks for the purpose of providing text message services to a host device via a media-delivery network. More particularly, the present invention relates to integrating telecommunications and cable television networks for the purpose of providing text messages comprising caller identification, short message service (SMS) and news alerts to a host device through a media-delivery network such as a cable television network.

BACKGROUND OF THE INVENTION

Many telephone services are available on mobile as well as wired telephones. These services include caller identification (caller ID), voicemail, news and stock quote alerts and short text message services. Mobile phone users do not always keep their phones in their immediate vicinity, nor do they keep their mobile phones perpetually turned on. Further, there are occasions when using a mobile phone, while possible, may be inconvenient. If telephone services were able to be delivered via alternate mechanisms that take advantage of devices that are present in the user's home, then the value of the services would be increased. The present invention provides an alternative delivery system and method to deliver communication services to a cable host device, such as facilitates the delivery of cable television programming.

SUMMARY OF THE INVENTION

The present invention relates to a system and method for integrating telecommunications and cable networks for the purpose of delivering text messages from a communication network to a host device over a media delivery network. The text messages may provide caller identification, SMS messages, or news alerts that are often received by a mobile phone.

BRIEF DESCRIPTION OF THE SEVERAL VIEWS OF THE DRAWINGS

The present invention is described in detail below with reference to the attached drawing figures, which are incorporated by reference herein, and wherein.

DETAILED DESCRIPTION OF THE INVENTION

Figure 1:
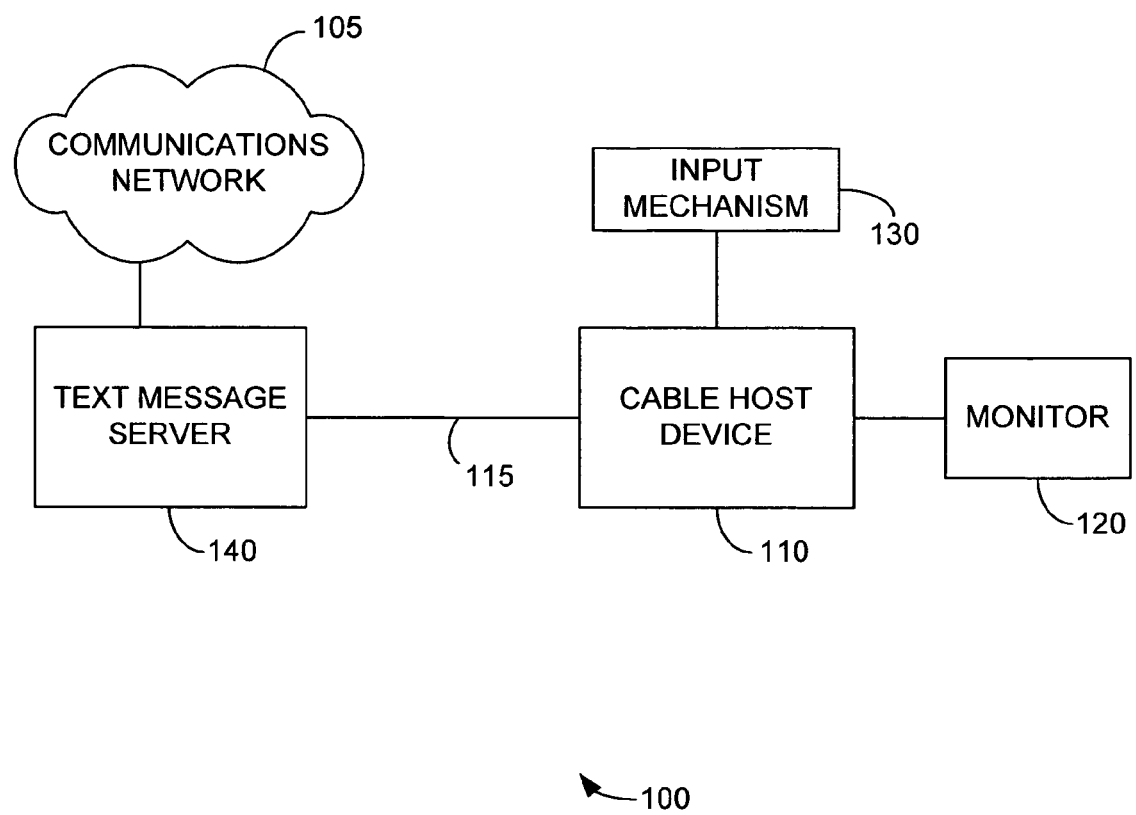
FIG. 1 illustrates a system architecture for delivering text messages to a cable host device in accordance with the present invention.

The present invention permits the integration of one or more communication network with one or more media-delivery network. One result of the integration is the ability to deliver communication services over the media-delivery network to a host device. While the type of communication network described in detail herein is a telecommunication network, and, more particularly, a mobile telecommunication network, one skilled in the art will appreciate that the present invention may be implemented with other types of communication networks that permit the multi-directional exchange of information (in any format, including analog). Likewise, one skilled in the art will appreciate that while cable television networks are described herein as an example of a media-delivery network, the present invention may be implemented with other types of media delivery networks that permit the substantially uni-directional delivery of media content.

Telephone services provided via a mobile telephone may be delivered to a cable host device in accordance with the present invention. A telephone network that provides telephone services is usually owned by a telephone carrier and is separate from a cable network that provides cable-television programming and is owned by a cable operator. However, the present invention is applicable regardless of the ownership and degree of integration of the communication and media delivery networks.

The present invention may deliver communication services associated with a communication network, such as a mobile telephone network, to a media-delivery network, such as a digital cable television network, by interfacing the two networks, for example at a cable head end, and delivering services over the media-delivery network. In the example of digital cable television, services may be delivered on the unbound signaling channel typically employed in a digital cable television network or on one or more bound digital cable channels. In accordance with the present invention, services may be delivered on any type of bound digital channel, including a premium channel, a pay-per-view channel, a regular channel, or an unbound channel used to deliver programming information.

In a digital cable television network, content is delivered on multiple bound channels, and a user selects content by selecting at the cable host device the channel on which the desired content is available. The cable host device then displays the content on the desired channel on a monitor, which is often a television screen. Media content on bound channels flows uni-directionally from a cable head end to the cable host devices connected to that cable head end.

A digital cable network also uses one or more unbound channels to exchange information other than media content bi-directionally between a cable host device and a cable head end. For example, information regarding upcoming programming on bound channels may be transmitted on an unbound channel from the cable head end to the cable host device. Selection by a user may then cause such programming information to be displayed on a monitor. However, information may also be transmitted from a cable host device to a cable head end, such as registration information upon power up of the cable host device and information necessary for authentication and/or billing upon selection of pay-per-view program by a user. In the case of communication services, such as text message delivery which require an immediate delivery interrupting the current bound channel selection, a system may use one or more unbound channels to deliver the content.

Although there is no reason that the present invention could not be implemented in a wholly owned scenario wherein both the telephone network and the cable network belong to the same entity, the invention is described in detail herein for the exemplary scenario where two entities must cooperatively integrate separate networks to provide the services.

Text messaging is a popular communication mechanism between mobile devices. Text messaging generally refers to sending short text messages to a device such as a mobile phone, personal digital assistant (PDA) or pager. Text messaging is often used for messages that are no longer than a few hundred characters. A variety of information, such as sports scores, financial information, caller information, or any other type of information may be transmitted as a text message.

Short message service (SMS) is an industry standard for text messaging that is used frequently between two mobile devices, possibly using different telephone service providers. An SMS message may be no longer than 160 characters and contain no images or graphics.

Caller identification is a term used to describe a text display of the caller information when a telephone call is received. A text message can be created to contain the caller identification information for display to a television monitor when using a mobile telephone is inconvenient or not possible. When the caller identification message is displayed, a mobile telephone user can decide if he desires to answer the call and locate his mobile telephone, even if he cannot hear the ring.

Another use for text messaging in accordance with the present invention is for the delivery of electronic mail, often referred to as email. The present invention may also be used for text based communications such as instant messages and "chat" sessions such as are often carried out on wireless mobile telephones and/or the Internet. Yet another use for the present invention is for the delivery of alert messages containing news headlines, sports scores, stock quotes, or other brief messages. Of course, one skilled in the art will appreciate that a wide variety of types of information may be transmitted as a text message.

Text messages typically are composed of data fields that may vary depending on the types of message and the information contained in the message. Most, but certainly not all, text messages may contain the recipient telephone number, the message content, and the date and the time of the message. Other data fields may be appropriate for various text message usages.

Referring to FIG. 1, an architecture 100 to deliver text messages to a cable host device in accordance with the present invention is illustrated. A cable host device 110 is connected to a monitor 120 and receives user input through an input mechanism 130. Cable host device 110 may be, for example, a separate device such as is commonly referred to as a set-top box or built in to monitor 120. Examples of cable host device 110 include a television set-top box or a television-integrated component for hosting cable television software. Cable host device 110 may be manufactured with a Media Access Control (MAC) address that may be used to uniquely identify the device within a network of similar devices.

In one embodiment, cable host device 110 may include resident software to provide channel guides and programming content. Information regarding channel guides and programming content may be received over an unbound channel. Examples of such cable-host-device software include resident navigator applications such as Passport or Scientific Atlanta Resident Application (SARA) and operating-system software such as PowerTV. Examples of monitor 120 connected to cable host device 110 include a television or a computer monitor. Input mechanism 130 may be an infra-red remote control device sensed by cable host device 110. Other devices, such as mobile telephones, keyboards, or personal digital assistants (PDAs) could also be used as an input mechanism. The connection between input mechanism 130 and cable host device 110 may be wireless, such as an infra-red, radio, 802.11x, Bluetooth, etc., or directly by a cable or other physical connection such as a Universal Serial Bus (USB) connector. Input mechanism 130 may directly interface with cable host device 110 as in the case of a set-top box or may interface with cable host device 110 via an intermediary device such as a personal computer.

Cable host device 110 connects to a text message server 140 over media delivery network 115 to receive the text messages transmitted over an unbound channel. Media delivery network 115 may be a cable television network, and may further comprise various components such as a cable head end, a broadcast carousel, cable transmission media, etc. Text message server 140 may receive a text message from communication network 105. which may be, for example, a mobile telephone network or the Internet. One skilled in the art will appreciate that cable host device 110 connecting to text message server 140 may involve intermediate steps and equipment between the host device 110 and the server 140. In accordance with the present invention, information necessary to deliver communication services to cable host device 110 may be transmitted in any fashion. For example, a text message server 140 may transmit information to cable host device 110 over an unbound channel, either directly or through an intermediary.

Figure 2:
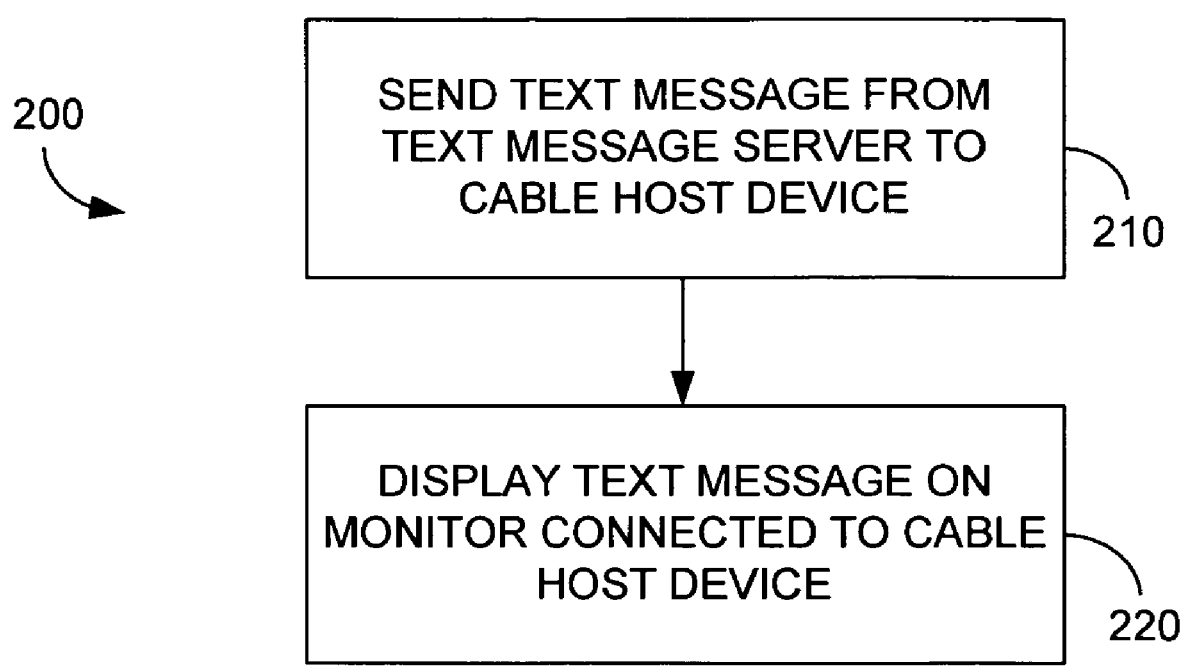
FIG. 2 illustrates a method for delivering text messages to a cable host device in accordance with the present invention.

Referring now to FIG. 2, a method 200 in accordance with the present invention for delivering text messages via a cable host device is illustrated. In step 210 a text message is sent from text message server 140 to cable host device 110. In step 220 the text message is displayed on monitor 120 connected to cable host device 110. The text message may contain any of a number of types of messages, for example, caller identification, short message service (SMS), or alert messages containing news headlines, sports scores, or stock quotes.

In the case where the text message is a caller identification message, the text message may comprise fields such as the name of the caller, the telephone number of the caller, the date of the call, and/or the time of the call. The display of the text message may appear at any location on the screen of monitor 120. Alternatively, an icon indicator may be displayed that, when selected using input mechanism 130, further displays the text message on the screen of monitor 120.

In the case where the text message is a SMS message, the text message may comprise data fields such as sender telephone number, text message, recipient telephone number, the date of the message, and/or the time of the message. The display of the text message may appear at any location on the screen of monitor 120. Alternatively, an icon indicator may be displayed that, when selected using input mechanism 130, further displays the text message on the screen of monitor 120.

In the case where the text message is an email, the text message may comprise data fields such as sender email address, subject line, other recipients of the message, the date of the message and/or the time of the message, and the text of the message. The display of the text message may appear at any location on the screen of monitor 120. Alternatively, an icon indicator may be displayed that, when selected using input mechanism 130, further displays the text message on the screen monitor 120.

In the case where the text message is an instant message, the text message may comprise data fields such as the sender telephone number or instant message identifier, the time of the message, and the text of the message. The display of the text message appear at any location on the screen of monitor 120. Alternatively, an icon indicator may be displayed that, when selected using input mechanism 130, further displays the text message on the screen monitor 120.

In the case where the text message in all or part of a chat session, the text message may comprise data fields such as participant identities and chat text. The display of the text message appear at any location on the screen of monitor 120. Alternatively, an icon indicator may be displayed that, when selected using input mechanism 130, further displays the text message on the screen monitor 120.

In the case where the text message is a stock quote, a sports score or a news headline alert, the text message may comprise fields such as type of alert message, source of message, the content of the alert message, the date of the message, and/or the time of the message. The display of the text message may appear at any location on the screen of monitor 120. Alternatively, an icon indicator may be displayed, that when selected using input mechanism 130 further displays the text message on the screen of monitor 120.

Figure 3:
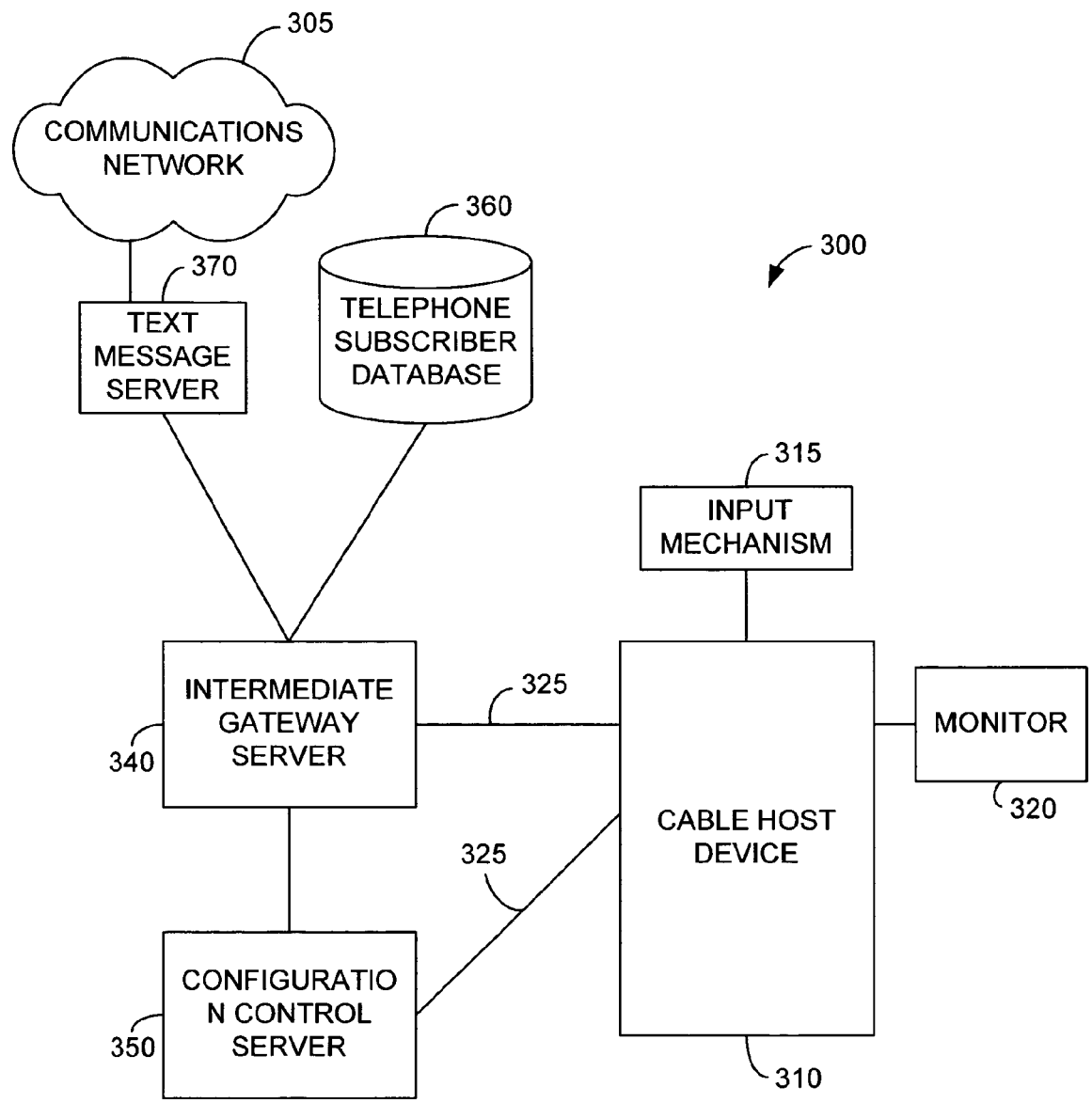
FIG. 3 illustrates a further system architecture to deliver text messages via a cable host device in accordance with the present invention.

Referring now to FIG. 3, a further architecture 300 to deliver telephone services to a cable host device in accordance with the present invention is illustrated. A cable host device 310 is connected to a monitor 320 and an input mechanism 315. Cable host device 310 may be, for example, a separate device such as is commonly referred to as a set-top box or built in to monitor 320. Examples of cable host 310 include a television set-top box or a television-integrated component for hosting cable television software. Cable host device 310 may be manufactured with a MAC address that may be used to identify the device uniquely within a network of similar devices. Examples of monitor 320 connected to cable host device 310 include a television or a computer monitor. Input mechanism 315 may be an infra-red remote control device sensed by cable host device 310. Other devices such a mobile telephones, keyboards, or PDAs could also be used as an input mechanism 315. The connection between input mechanism 315 and cable host device 310 may be wireless, such as an infra-red, radio, 802.11x, Bluetooth, etc. or directly by a cable or other physical connection such as a USB connector. Input mechanism 315 may directly interface with cable host device 310 as in the case of a set-top box or may interface with cable host device 310 via an intermediary device such as a personal computer.

Cable host device 310 connects to an intermediate gateway server 340. Intermediate gateway server 340 connects to a telephone subscriber database 360 to verify the telephone services and to text message server 370 to receive text messages. Text message server 370 may connect to communication network 305 to receive text messages. Communication network 305 may comprise, for example, a mobile telephone network or the Internet. Cable host device 310 connects to configuration control server 350 which controls addressing and content for a plurality of cable host devices. Cable host device 310 connects to intermediate gateway server 340 and/or configuration control server 350 over a media delivery network 325. Media delivery network 115 may be a cable television network, and may further comprise various components such as a cable head end, a broadcast carousel, cable transmission media, etc.

In accordance with the present invention, information necessary to deliver communication services to cable host device 310 may be transmitted in any fashion. For example, a text message server 370 may transmit information to cable host device 310 over an unbound channel, either directly or through an intermediary such as configuration control server 350 or intermediate gateway server 340.

Figure 4:
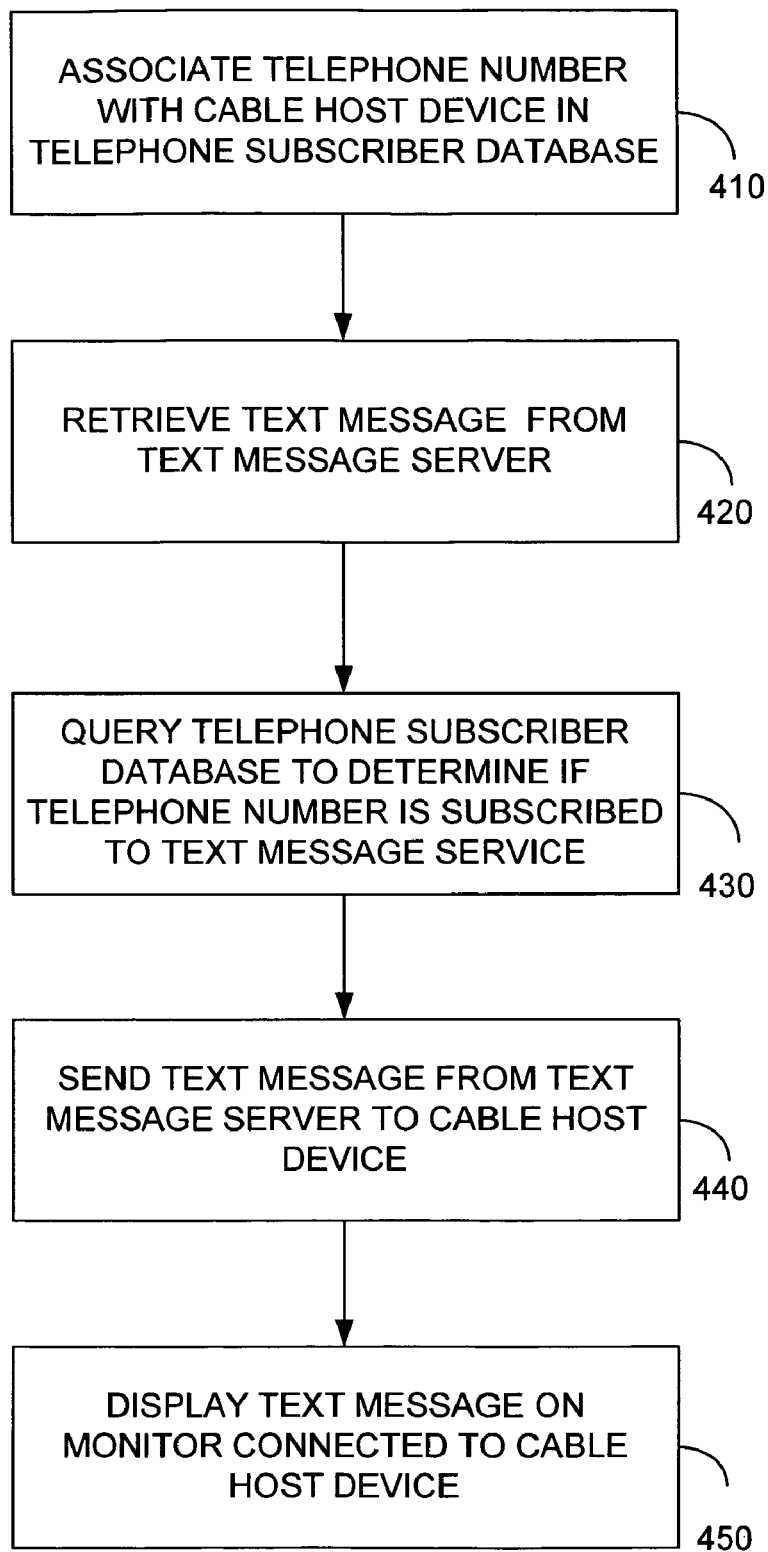
FIG. 4 illustrates a further method for delivering text messages to a cable host device in accordance with the present invention.

Referring now to FIG. 4, a method 400 for delivering a text message to a cable host device 310 in accordance with the present invention is illustrated. In step 410 a telephone number is associated with a cable host device 310. The association of step 410 may occur in a telephone subscriber database 360. Multiple telephone numbers may be associated with a cable host device 310. A single telephone number may be associated with a plurality of cable host devices 310, for example, when a household has multiple cable host devices. On receiving an incoming message to a telephone number, in step 420 the text message is retrieved from text message server 370. The text message may be of any of a number of types of messages, for example, caller identification, SMS message, stock quote, sports score or news headline alert. In step 430 the telephone subscriber database 360 is queried to determine if the called telephone number is subscribed to the service allowing text messages to be delivered to cable host device 310. If the called telephone number is subscribed to the service, in step 440 the text message is sent from text message server 370 to the subscribed cable host device 310 on an unbound signaling channel.

Step 440 may be accomplished in a number of ways. For example, a single message containing the text message and subscribed destination cable host devices may be assembled by telephone subscriber database 360 and passed through intermediate gateway 340 to the subscribed destination cable host devices 310. Intermediate gateway server 340 may look up the IP address of the cable host device 310 by sending the MAC address of cable host device 310 to configuration control server 350 prior to sending the message to cable host device 310. Intermediate gateway server 340 may generate separate messages for each destination cable host device 310 in this scenario. Alternatively, a message containing the text message may be generated by telephone subscriber database 360 for each subscribed destination cable host device 310. Intermediate gateway server 340 may look up the IP address of the cable host device 310 by sending the MAC address to configuration control server 350 prior to sending each message.

In step 450 the text message is displayed on monitor 320 connected to cable host device 310. The display of the text message may appear any place on the monitor screen. Alternatively, an icon indicator may be displayed. A user may then select the displayed icon indicator using input mechanism 315 to further display the text message on the screen of monitor 320.

Figure 5A:
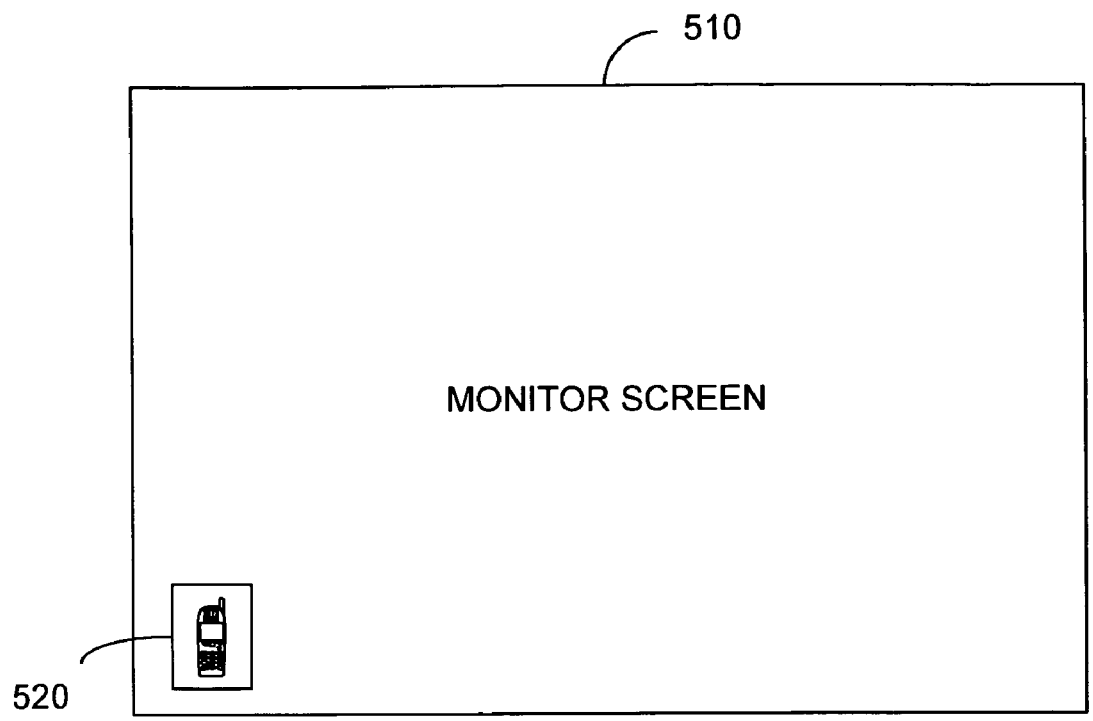
FIG. 5a and FIG. 5b illustrates an example monitor screen display for caller identification text messages in accordance with the present invention.
Figure 5B:
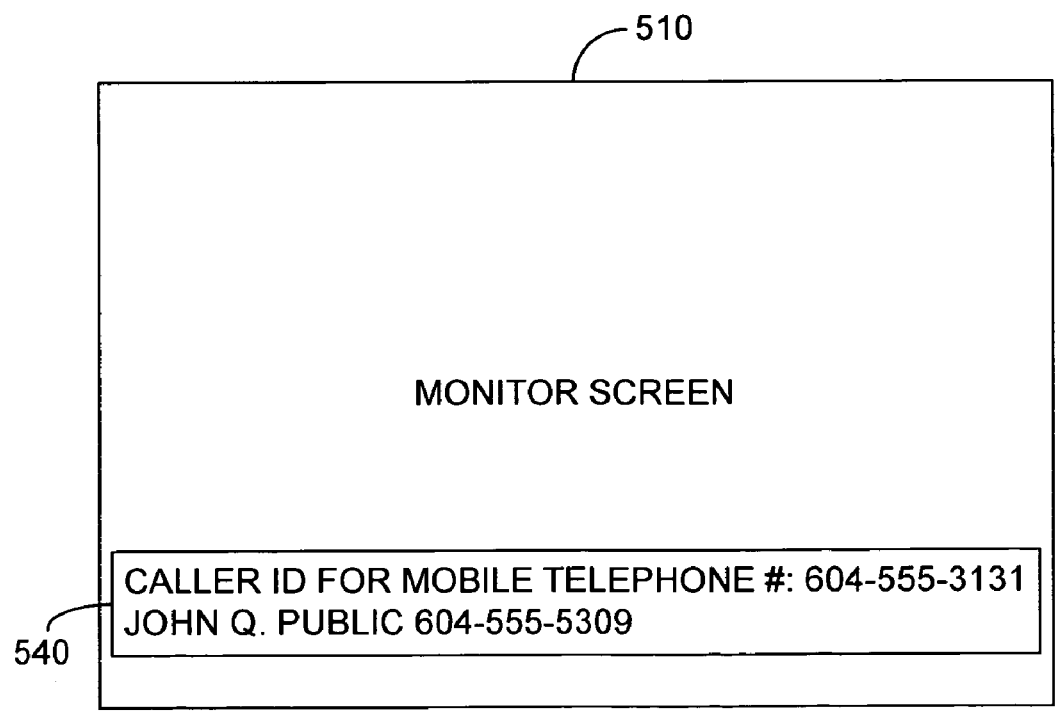

Referring now to FIG. 5a, an example monitor screen 510 for displaying a caller identification text message in accordance with the present invention is illustrated. An icon indicator 520 is displayed on monitor screen 510, which indicates that a caller identification message is available. Icon indicator 520 is shown at the bottom left corner of monitor screen 510, but alternatively may appear at any location, including top right, top left, bottom right, or center, depending on the user's preference. A user may select icon indicator 520 using input mechanism 315 causing the caller identification message to be displayed as depicted in FIG. 5b. Alternatively, the user may set a timeout indicating the length of time to display indicator 520 before clearing monitor screen 510. Another option is to clear indicator 520 from monitor screen 510 when the call is no longer pending, i.e. the caller has hung up.

In FIG. 5b, an example monitor screen 530 for displaying a caller identification text message in accordance with the present invention is illustrated. A caller identification message 540 is displayed on monitor screen 530. Caller identification message 540 is shown at the bottom of monitor screen 530, but alternatively may appear at any location, including top, side or center, depending on the user's preference. Alternatively, a user could opt to skip the icon indicator display depicted in FIG. 5a and directly display caller identification message 540 when available. Optionally, the content of message 540 displayed may be varied depending on the user's preferences. For example, in order to limit the space required to display message 540, the user may select to only show the name and telephone number of the caller. Alternatively, the date and time may be displayed as well.

Caller identification message 540 may be cleared by selecting message 540 with input mechanism 315. Alternatively, the user may set a timeout indicating the length of time to display message 540 before clearing monitor screen 530.

Figure 6A:
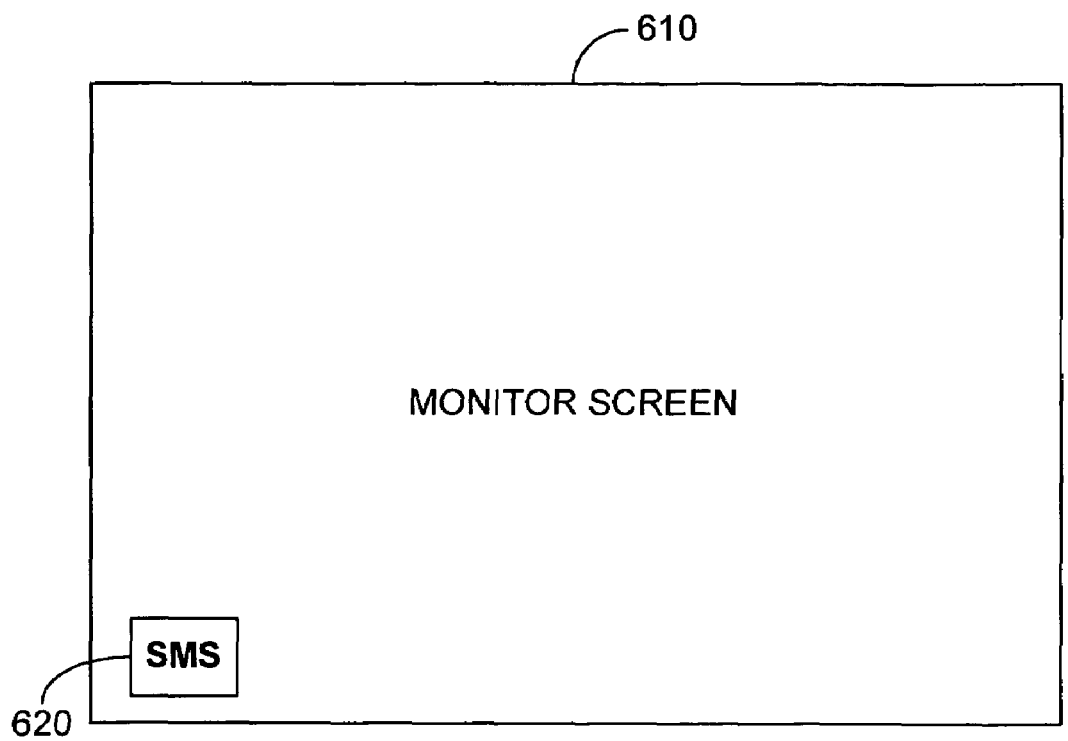
FIG. 6a and FIG. 6b illustrates an example monitor screen display for short message system text messages in accordance with the present invention.
Figure 6B:
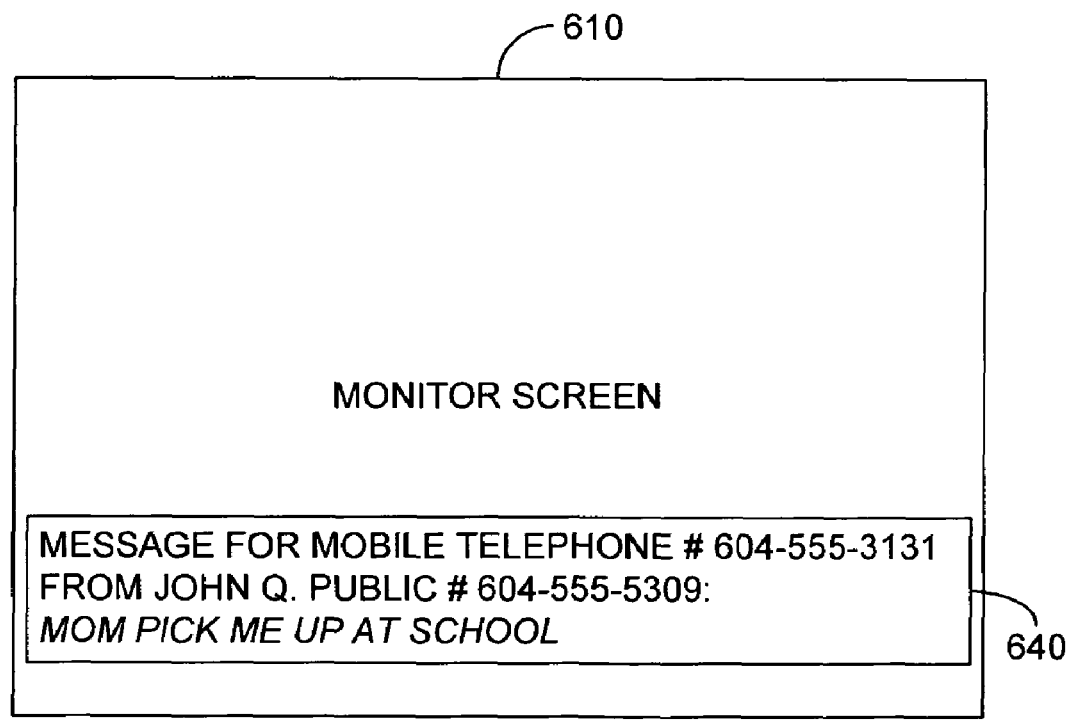

Referring now to FIG. 6a, an example monitor screen 610 for displaying a short message service (SMS) message in accordance with the present invention is illustrated. An icon indicator 620 is displayed on monitor screen 610, which indicates that a SMS message is available. Icon indicator 620 is shown at the bottom left corner of monitor screen 610, but alternatively may appear at any location, including top right, top left, bottom right, or center, depending on the user's preference. A user may select icon indicator 620 using input mechanism 315 causing the SMS message to be displayed as depicted in FIG. 6b. Alternatively, the user may set a timeout indicating the length of time to display indicator 620 before clearing monitor screen 610.

In FIG. 6b, an example monitor screen 630 for displaying a SMS text message in accordance with the present invention is illustrated. A SMS message 640 is displayed on monitor screen 630. SMS message 640 is shown at the bottom of monitor screen 630, but alternatively may appear at any location, including top, side or center, depending on the user's preference. Alternatively, a user could opt to skip the icon indicator display depicted in FIG. 6a and directly display SMS message 640 when available. Optionally, the content of message 640 displayed may be varied depending on the user's preferences. For example, in order to limit the space required to display message 640, the user may select to only show telephone number of the sender and the message content. Alternatively, the sender's name or the message date and time may be displayed as well.

SMS message 640 may be cleared by selecting message 640 with input mechanism 315. Alternatively, the user may set a timeout indicating the length of time to display message 640 before clearing monitor screen 630.

Figure 7:
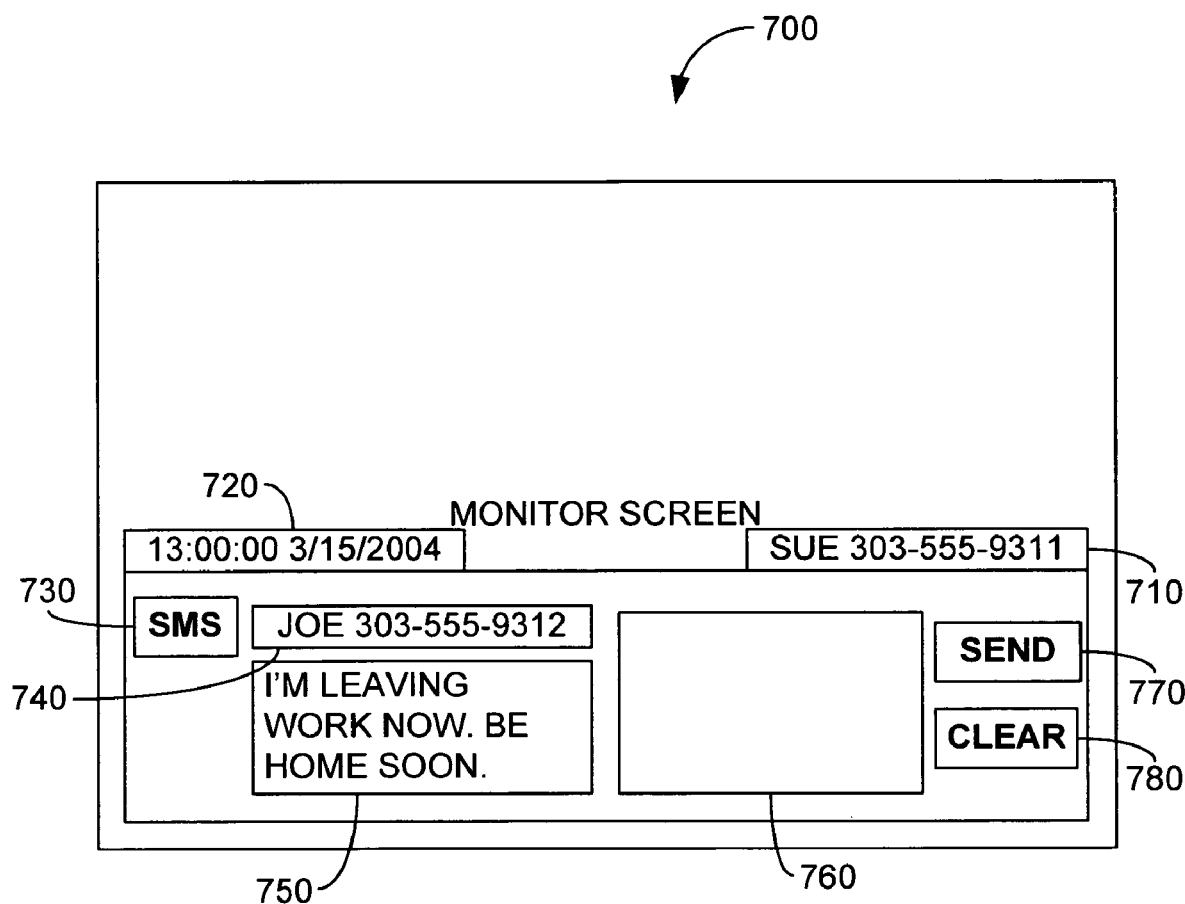
FIG. 7 illustrates a further example monitor screen display for short message system text messages in accordance with the present invention; and FIG. 8a and FIG. 8b illustrates an example monitor screen display for alert messages in accordance with the present invention.

In FIG. 7, a further example of a monitor screen 700 for displaying a short message service message (SMS) in accordance with the present invention is illustrated. The user may alternatively prefer the display in FIG. 7 rather than the display in FIG. 6b for reviewing SMS text messages as it provides for the ability to send a response message. In another scenario, the user may move from the display in FIG. 6b to the display in FIG. 7 after reading the message and deciding a response message is necessary.

The display in FIG. 7 may be supported by a bound application running on a channel within the media-delivery network. For instance, when displaying the response message display 700, the cable host device may tune to a specific channel, for example, channel 20, which runs the application responsible for displaying response message display 700. In some implementations, this action may be accomplished over the current channel display as a sub-screen display. Alternatively, response message display 700 could be a full screen display which, when cleared, automatically re-tuned the cable host box to the channel that was active when response message display 700 was requested. The user may also tune to the specific channel, for example, channel 20, to send a message without receiving a message first. In this scenario, the application responsible for displaying response message display 700 may run when the specific channel is selected, in either sub-screen or full screen mode.

Response message screen 700 displays the message recipient information 710 and the date and time 720 on monitor 320. An icon indicator 730 displays from which message service this message was received. The message sender information 740 is displayed along with the message in a message box 750. A response message box 760 is available for the user to enter a response message using input mechanism 315. A send button 770 sends the message when selected using input mechanism 315. A clear button 780 clears response message display 700 when selected using input mechanism 315.

Figure 8A:
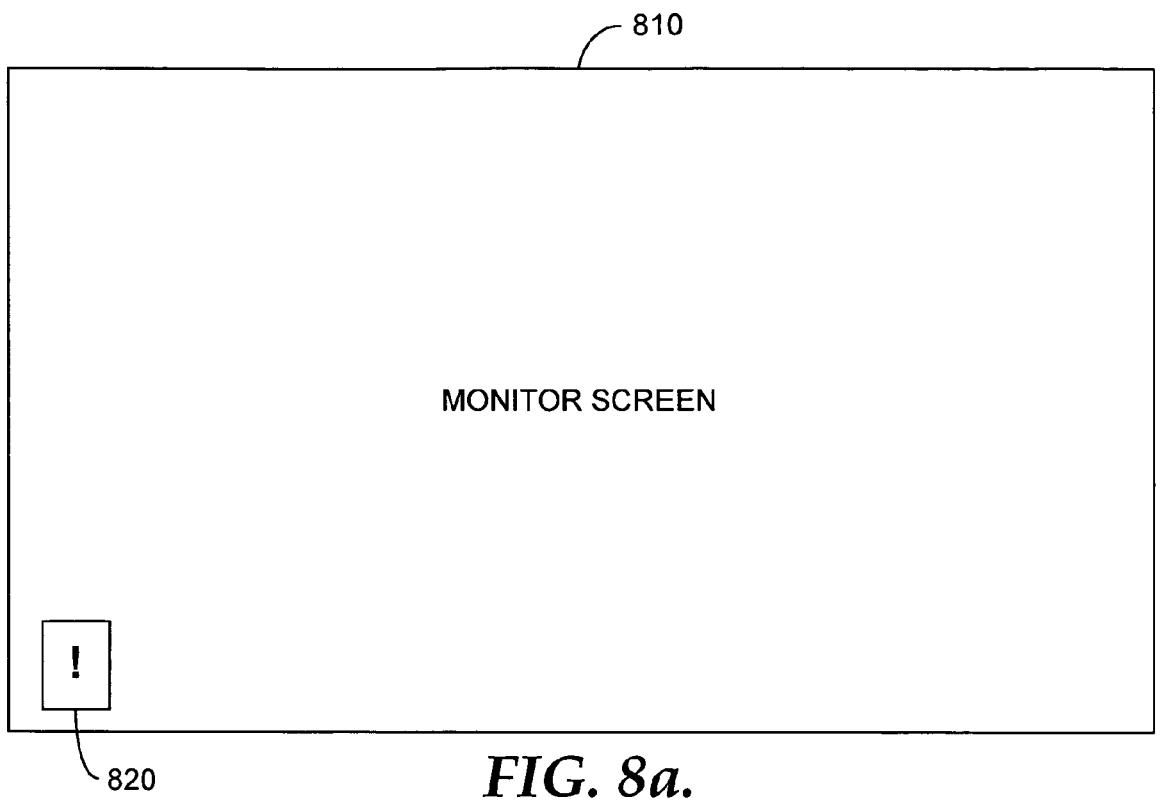
Figure 8B:
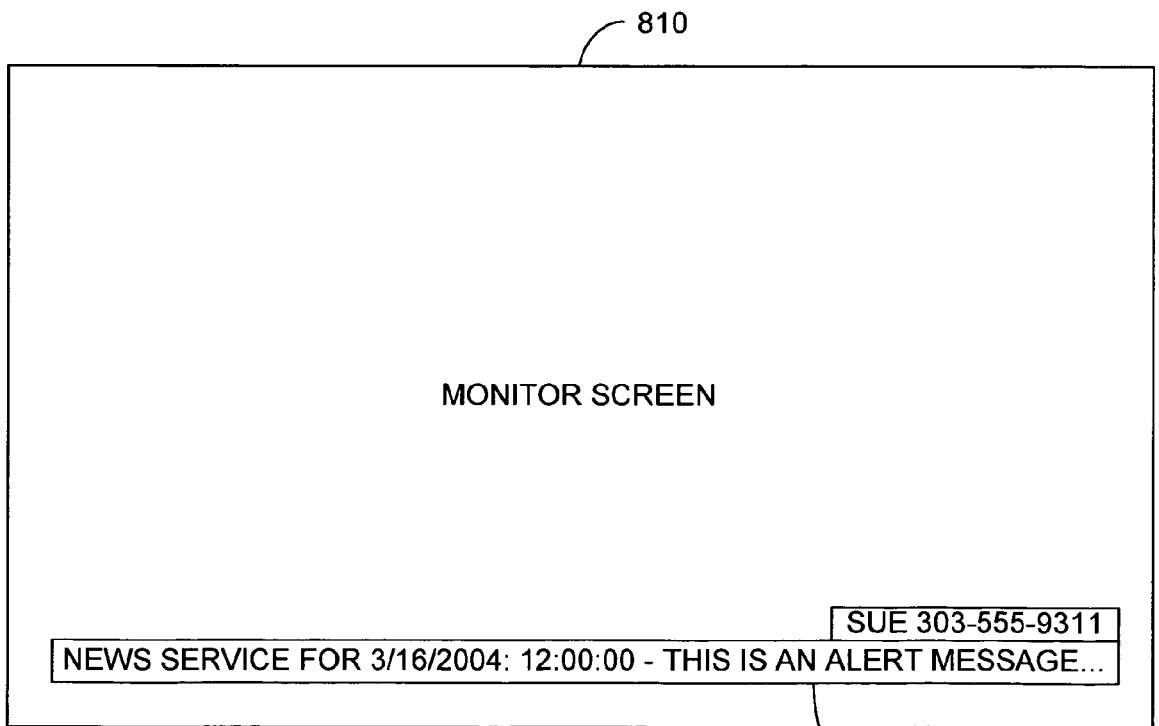

Referring now to FIG. 8a, an example monitor screen 810 for displaying an alert message in accordance with the present invention is illustrated. An icon indicator 820 is displayed on monitor screen 810, indicating that an alert message is available. Icon indicator 820 is shown at the bottom left corner of monitor screen 810, but alternatively may appear at any location, including top right, top left, bottom right, or center, depending on the user's preference. A user may select icon indicator 820 using input mechanism 315 causing the alert message to be displayed as depicted in FIG. 8b. Alternatively, the user may set a timeout indicating the length of time to display indicator 820 before clearing monitor screen 810.

In FIG. 8b, an example monitor screen 830 for displaying an alert text message in accordance with the present invention is illustrated. An alert message 840 is displayed on monitor screen 830. Alert message 840 is shown at the bottom of monitor screen 830, but alternatively may appear at any location, including top, side or center, depending on the user's preference. Alternatively, a user could opt to skip the icon indicator display depicted in FIG. 8a and directly display alert message 840 when available. Optionally, the content of message 840 displayed may be varied depending on the user's preferences and the type of alert message received. For example, for a stock quote, message 840 may display stock symbol and price. A news alert may contain a news headline as the message content while a sports score update may contain the teams and scores for a particular game.

Alert message 840 may be cleared by selecting message 840 with input mechanism 315. Alternatively, the user may set a timeout indicating the length of time to display message 840 before clearing monitor screen 830.

One skilled in the art will appreciate the above discussion is exemplary only, and that the present invention may be practiced using systems and methods other than those described above. For example, the type of information conveyed in accordance with the present invention need not be limited to those described herein. Moreover, the format(s) and/or protocol(s) used need not be limited to SMS or any other particular format/protocol. One skilled in the art will further appreciate that a cable host device used in conjunction with the present invention may take a variety of forms and may possess additional functionality beyond that described herein.

The invention claimed is:

1. A method of delivering text messages to a cable host device comprising:
   receiving a text message at a cable host device from a text message server, wherein the cable host device is connected to a monitor and receives user input through an input mechanism;
   providing an identifier of the cable host device to the text message server from a telephone subscriber database that correlates the cable host device identified by the identifier with the telephone number to which the text message was directed;
   displaying an indicator on the monitor connected to the cable host device that the text message is available;
   receiving a selection of the displayed indicator from an input mechanism connected to the cable host device; and
   displaying the text message on the monitor connected to the cable host device in response to receiving the selection of the displayed indicator.

2. The method of claim 1, further comprising sending a response text message from the cable host device to the text message server.

3. The method of claim 1, wherein the text message is a caller identification message.

4. The method of claim 1, wherein the text message is a short message service text message.

5. The method of claim 1, wherein the text message is an email.

6. The method of claim 1, wherein the text message is an instant message.

7. The method of claim 1, wherein the text message is a chat session.

8. The method of claim 1, wherein the text message is an alert message comprising a news headline, a stock quote or a sports score.

9. A method of delivering a text message to a cable host device comprising:
   associating a cable host device with a mobile telephone number by registering the cable host device address with a telephone subscriber database through an intermediate gateway server;
   querying the telephone subscriber database to determine whether the mobile telephone device subscribes to a cable host device text message service;
   providing an identifier of the cable host device to a text message server from the telephone subscriber database that correlates the cable host device identified by the identifier with the mobile telephone number to which the text message was directed;
   sending text message to each subscribed cable host device from the text message server through the intermediate gateway server;
   displaying an indicator on a monitor connected to the cable host device that the text message is available;
   receiving a selection of the displayed indicator from an input mechanism connected to the cable host device; and
   displaying the text message on the monitor connected to the cable host device in response to receiving the selection of the displayed indicator.

10. The method of claim 9 where sending text message to each subscribed cable host device through an intermediate gateway server further comprises:
    querying configuration control server for the cable host device IP address using the cable host device MAC address.

11. The method of claim 10 where sending text message to each subscribed cable host device through an intermediate gateway server further comprises:
    sending text message to intermediate gateway server;
    creating a message containing the text message at the intermediate gateway server; and
    sending the message from the intermediate gateway server to each subscribed, active cable host device.

12. The method of claim 9 further comprising:
    sending a second text message to the sender of text message from the cable host device.

13. A system to deliver a text message to a cable host device comprising:
    a media delivery network;
    a cable host device that receives information from the media delivery network;
    a monitor operably connected to the cable host device;
    a configuration control component that interfaces with the media delivery network and that provides the current IP address for a cable host device; and
    a text message server that delivers text messages to the cable host device over the media delivery network; and
    a telephone subscriber database that correlates telephone numbers with cable host devices, the telephone subscriber database interfacing with the text message server to provide the text message server with an identifier of the cable host device that correlates with a telephone number to which a text message is directed.

14. The system claim 13, further comprising:
    an intermediate gateway server that connects to the telephone subscriber database and text message server to the media delivery network.

15. The system of claim 14 further comprising:
    an input mechanism connected to the cable host device by one of the following: IEEE 802.11x, infra-red, Bluetooth, wireless mobile telephone network Firewire, and USB.

* * * * *

UNITED STATES PATENT AND TRADEMARK OFFICE
CERTIFICATE OF CORRECTION

| | | |
|---|---|---|
| PATENT NO. | : 7,636,578 B1 | Page 1 of 1 |
| APPLICATION NO. | : 11/117205 | |
| DATED | : December 22, 2009 | |
| INVENTOR(S) | : Cope et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1239 days.

Signed and Sealed this

Ninth Day of November, 2010

David J. Kappos
*Director of the United States Patent and Trademark Office*